United States Patent [19]

Yamaya et al.

[11] Patent Number: 5,084,507
[45] Date of Patent: * Jan. 28, 1992

[54] THERMOSETTING RESIN COMPOSITION

[75] Inventors: Norimasa Yamaya; Masahiro Ohta, both of Yokohama; Akihiro Yamaguchi, Kamakura, all of Japan

[73] Assignee: Mitsui Toatsu Chemicals, Inc., Tokyo, Japan

[*] Notice: The portion of the term of this patent subsequent to May 16, 2006 has been disclaimed.

[21] Appl. No.: 488,480

[22] Filed: Feb. 27, 1990

Related U.S. Application Data

[63] Continuation of Ser. No. 189,718, May 3, 1988, abandoned.

[30] Foreign Application Priority Data

May 6, 1987 [JP] Japan .................. 62-108960

[51] Int. Cl.$^5$ .................. C08K 3/36; C08L 79/08
[52] U.S. Cl. .................. 524/607; 524/606; 524/493
[58] Field of Search .................. 524/493, 606, 607; 528/170

[56] References Cited

U.S. PATENT DOCUMENTS

| Re. 29,316 | 7/1977 | Bargain et al. | 260/30.2 |
|---|---|---|---|
| 3,658,764 | 4/1972 | Bargain et al. | 260/78 UA |
| 3,669,930 | 6/1972 | Asahara et al. | 260/47 CZ |
| 3,862,918 | 1/1975 | Laurent et al. | 260/37 N |
| 4,076,697 | 2/1977 | Forgo et al. | 260/78 UA |
| 4,116,937 | 9/1978 | Jones | 528/170 |
| 4,144,284 | 3/1979 | Semanaz et al. | 260/857 |
| 4,390,596 | 6/1983 | Laurent | 428/473.5 |
| 4,435,560 | 3/1984 | Takahashi | 528/170 |
| 4,526,838 | 7/1985 | Fujioka | 528/170 |
| 4,691,025 | 9/1987 | Domeier | 528/172 |
| 4,707,316 | 11/1987 | Fujioka et al. | 264/135 |
| 4,777,237 | 10/1988 | Dien | 528/170 |
| 4,831,102 | 5/1989 | Yamaya | 528/170 |

FOREIGN PATENT DOCUMENTS

| 0192480 | 8/1986 | European Pat. Off. |
| 0233435 | 8/1987 | European Pat. Off. |
| 59560 | of 1985 | Japan . |
| 0221158 | 10/1986 | Japan . |
| 1263234 | 2/1972 | United Kingdom . |
| 1440550 | 6/1976 | United Kingdom . |

OTHER PUBLICATIONS

Katz, *Handbook of Fillers and Reinforcements for Plastics*, pp. 155-157.

Primary Examiner—John C. Bleutge
Assistant Examiner—David Buttner
Attorney, Agent, or Firm—Fisher, Christen & Sabol

[57] ABSTRACT

A thermosetting resin composition formed of a polyaminobismaleimide resin, which is composed of a bismaleimide compound and a diamine compound, and a powdery inorganic filler. The composition has excellent heat resistance as well as superb mechanical properties at high temperature not to mention room temperature, and is expected to find wide-spread commerical utility in electric and electronic components such as sealing materials, sockets and connectors and other applications.

3 Claims, No Drawings

THERMOSETTING RESIN COMPOSITION

This application is a continuation of prior U.S. application Ser. No. 189,718 filing date May 3, 1988 now abandoned.

BACKGROUND OF THE INVENTION

1. Field of the Invention

This invention relates to a thermosetting resin composition having excellent heat resistance and high-temperature mechanical properties.

2. Description of the Prior Art

In order to seal electronic components such as diodes, transisters and integrated circuits, resin seal making use of a thermosetting resin has been used widely to date because the resin seal has been economically advantageous over hermetic seal making use of a glass, metal or ceramics. As the resin sealing materials, epoxy resins suitable for use in low-pressure molding may generally be used from the viewpoints of reliability and cost. The epoxy moding materials useful for the low-pressure molding are prepared by mixing a novolak phenol resin as a hardener, 1,4-diazabicyclo[2,2,2]-octane or imidazol as a hardening accelerator, silica powder or alumina powder as a filler, etc. with a novolak cresol- or novolak phenol-epoxy resin and then heating and kneading them. These molding material are separately preheated as tablets. Thereafter, an insert is set in a mold, and its corresponding insoluble and infusible molded articles for electronic components are made from the tablets in accordance with the transfer molding, cast molding or dip molding.

These molding materials are however accompanied by the drawbacks that they are insufficient in heat resistance as the densification of electronic components advances and are hence poor in reliability.

SUMMARY OF THE INVENTION

An object of this invention is to provide a molding material of a heat-resistant resin having excellent heat resistance and mechanical properties.

The above object of this invention has now been accomplished by the provision of a thermosetting resin composition comprising:

100 parts by weight of a polyaminobismaleimide resin composed of a bismaleimide compound represented by the following general formula (I):

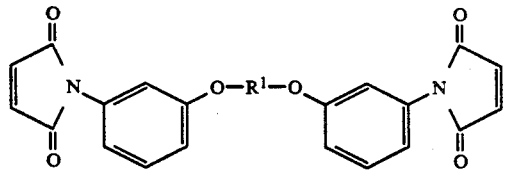

wherein R$^1$ means a divalent group of

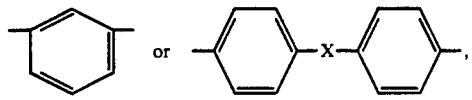

and X denotes a direct bond or a group selected from divalent hydrocarbon group having 1-10 carbon atoms, hexafluorinated isopropylidene group, carbonyl group, thio group, sulfinyl group, sulfonyl group and oxo group, and a diamine compound represented by the following general formula (II):

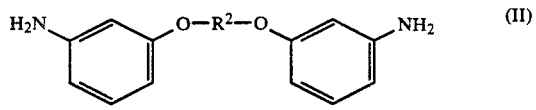

wherein R$^2$ means a divalent group of

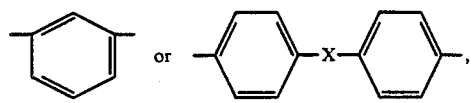

and X denotes a direct bond or a group selected from divalent hydrocarbon group having 1-10 carbon atoms, hexafluorinated isopropylidene group, carbonyl group, thio group, sulfinyl group, sulfonyl group and oxo group; and 30-800 parts by weight of a powdery inorganic filler.

The thermosetting resin composition of this invention has excellent heat resistance as well as superb mechanical properties at high temperature not to mention room temperature, and is expected to find wide-spread commercial utility in electric and electronic components such as sealing materials, sockets and connectors and other applications. It therefore has significant industrial utility.

DETAILED DESCRIPTION OF THE INVENTION

Illustrative examples of the bismaleimide compound (I), which is useful as one of the components of the polyaminobismaleimide resin in the present invention, include:

1,3-bis(3-maleimidophenoxy)benzene;
bis[4-(3-maleimidophenoxy)phenyl]methane;
1,1-bis[4-(3-maleimidophenoxy)phenyl]ethane;
1,2-bis[4-(3-maleimidophenoxy)phenyl]ethane;
2,2-bis[4-(3-maleimidophenoxy)phenyl]propane;
2,2-bis[4-(3-maleimidophenoxy)phenyl]butane;
2,2-bis[4-(3-maleimidophenoxy)phenyl]-1,1,1,3,3,3-hexafluoropropane;
4.4'-bis(3-maleimidophenoxy)biphenyl;
bis[4-(3-maleimidophenoxy)phenyl]ketone;
bis[4-(3-maleimidophenoxy)phenyl]sulfide;
bis[4-(3-maleimidophenoxy)phenyl]sulfoxide;
bis[4-(3-maleimidophenoxy)phenyl]sulfone; and
bis[4-(3-maleimidophenoxy)phenyl]ether.

They may be used either singly or in combination. These bismaleimide compounds may be prepared easily by subjecting their corresponding diamine compounds and maleic anhydride to condensation and dehydration.

Illustrative specific examples of the other component, the diamine compound (II), include:

1,3-bis(3-aminophenoxy)benzene;
bis[4-(3-aminophenoxy)phenyl]methane;
1,1-bis[4-(3aminophenoxy)phenyl]ethane;
1,2-bis[4-(3-aminophenoxy)phenyl]ethane;
2,2-bis[4-(3-aminophenoxy)phenyl]propane;
2,2-bis[4-(3-aminophenoxy)phenyl]butane;
2.2-bis[4-(3-aminophenoxy)phenyl]-1,1,1,3,3,3-hexafluoropropane;
4.4'-bis(3-aminophenoxy)biphenyl;
bis[4-(3-aminophenoxy)phenyl]ketone;

bis[4-(3-aminophenoxy)phenyl]sulfide;
bis[4-(3-aminophenoxy)phenyl]sulfoxide;
bis[4-(3-aminophenoxy)phenyl]sulfone; and
bis[4-(3-aminophenoxy)phenyl]ether.

They may also be used either singly or in combination.

As polyaminobismaleimide resins composed of the above-exemplified bismaleimide compounds and diamine compounds, may be mentioned (1) those obtained by simply mixing them and (2) those obtained by subjecting them to a heat treatment and then grinding the resultant mixture into pellets or powder. As heating conditions for the heat treatment, it is preferable to choose conditions in which they are partly hardened to the stage of prepolymer. In general, it is suitable to heat them at 70°–220° C. for 5–240 minutes, preferably at 80°–200° C. for 10–180 minutes. Also included are (3) those obtained by dissolving them in an organic solvent, pouring the resultant solution into a bad solvent, collecting the resultant crystals by filtration and then drying the thus-collected crystals into pellets or powder or by dissolving them in an organic solvent, hardening them partly to the stage of prepolymers, discharging the resultant mixture into a bad solvent, collecting the resultant crystals by filtration and then drying the thus-collected crystals into pellets or powder. As exemplary organic solvents usable upon formation of the resins (3), may be mentioned halogenated hydrocarbons such as methylene chloride, dichloroethane and trichloroethylene; ketones such as acetone, methyl ethyl ketone, cyclohexanone and diisopropyl ketone; ethers such as tetrahydrofuran, dioxane and methylcellosolve; aromatic compounds such as benzene, toluene and chlorobenzene; and aprotic polor solvents such as acetonitrile, N,N-dimethylformamide, N,N-dimethylacetoamide, dimethyl sulfoxide, N-methyl-2-pyrrolidone and 1,3-dimethyl-2-imidazolidinone.

Regarding the proportions of each bismaleimide compound and its corresponding diamine compound, the diamine compound may be used in an amount of 0.1–1.2 moles, preferably 0.2–0.8 moles, per mole of the bismaleimide compound. If the diamine compound is used in a smaller proportion, it is difficult to obtain a resin having good impact resistance and flexibility upon hardening. On the other hand, any unduly high proportions give deleterious effects to the heat resistance of a hardened resin to be obtained.

A variety of powdery inorganic fillers may be used in the present invention, including silica powder, alumina powder, silicon carbide powder, silicon nitride powder, boron nitride powder, zircon powder, calcium silicate powder and calcium carbonate powder by way of example. The use of silica powder, alumina powder and silicon carbide powder is particularly preferred. The particle size distribution of the powdery inorganic filler used in the present invention may desirably range from 1 to 50 μm.

As illustrative examples of the silica powder useful in the practice of this invention, may be mentioned those obtained by grinding high-purity quartz in a ball mill or the like into particles having a predetermined size distribution, by grinding amorphous quartz glass, which has been obtained by completely melting high-purity quartz at a high temperature of 1900° C., in a ball mill or the like into particles having a predetermined size distribution and by mixing both particles with each other. From the standpoint of properties, the particle size distribution in a range of 1–50 μm is particularly preferred.

The alumina powders usable in the practice of this invention may include, for example, those obtained by igniting and fusing an aluminum oxide ore and the grinding the thus-fused ore in a ball mill or the like into particles having a predetermined size distribution and by hydrolyzing anhydrous aluminum chloxide with an oxygen-hydrogen flame in a gaseous phase. From the standpoint of properties, the particle size distribution in a range of 1–50 μm is particularly preferred.

The silicon carbide powder usable in the practice of this invention may include that obtained by igniting carbon powder and clay powder as raw materials in an electric resistance furnace and then grinding the thus-ignited raw materials in a ball mill or the like into particles having a predetermined size distribution. From the standpoint of properties, the particle size distribution in a range of 1–50 μm is particularly preferred.

In the present invention, the powdery inorganic filler may be used in a proportion of 30–800 parts by weight, preferably 50–400 parts by weight, per 100 parts by weight of the above-mentioned polyaminobismaleimide resin composed of the bismaleimide compound and diamine compound. Any proportions smaller than 30 parts by weight cannot bring about effects imparting heat resistant, mechanical properties and moldability or formability, which constitute the characteristic features of the present invention. If, on the contrary, the powdery inorganic filler is used in a proportion greater than 800 parts by weight, the resultant composition is only increased in its quantity and shows poor fluidity upon forming or molding. It is hence unsuitable to use such a composition in practice.

Although the thermosetting resin composition according to the present invention may be prepared by a method known generally in the art, the following methods are particularly preferred:

(1) After mixing the polyaminobismaleimide resin in the form of powder and powdery inorganic filler in a mortar, Henschel mixer, drum blender, tumbler mixer, ball mill or similar device, and kneading the resultant mixture by a melting and mixing machine or heated roll as needed, the mixture is formed into pellets or powder.

(2) The polyaminobismaleimide resin powder is dissolved or suspended in an organic solvent in advance. The powdery inorganic filler is impregnated with the resultant solution or suspension. After removing the solvent in a hot-air oven, the resultant mixture is formed into pellets or powder. Since the temperature and time required for the kneading vary depending on the properties of the polyaminobismaleimide resin employed, they may be adjusted suitably so that the softening temperature and gelling time of the resultant composition fall within a range of 70°–180° C. and a range 30–180 seconds at 200° C.

The thermosetting resin composition of this invention may be added with a polymerization catalyst as needed. No particular limitation is imposed on the proportion of the catalyst. It is however preferable to use the catalyst within a range of 0.001–10 wt. %, preferably 0.1–5 wt. %, based on the total weight of the resultant polymer. As the polymerization catalyst, a known free radical catalyst is effective such as benzoyl peroxide, t-butylhydroperoxide, dicumyl peroxide, azobisisobutyronitrile or azobiscyclohexanecarbonitrile. Two or more of these polymerization catalysts may be used suitably in combination.

Further, it is also possible to use a releasing agent such as a higher fatty acid, metal salt thereof or ester wax, a colorant such as carbon black and/or a coupling agent such as an epoxysilane, aminosilane, vinylsilane, alkylsilane, organic titanate or aluminum alcoholate for the composition of the present invention, as long as the object of this invention is not impaired.

According to the use to be made of the final product, it is also feasible to incorporate, in suitable proportion or proportions, one or more of other thermosetting resins (e.g., phenol resins and epoxy resins) and thermoplastic resins (e.g., polyethylene, polypropylene, polyamide, polycarbonate, polysulfone, polyethersulfone, polyether ether ketone, modified polyphenylene oxide, polyphenylene sulfide and fluoroplastics) and/or one or more of fibrous reinforcing materials such as glass fibers, aromatic polyamide fibers, alumina fibers and potassium titanate fibers.

The thermosetting resin composition according to this invention is formed or molded for practical use by a method known per se in the art, for example, by compression molding, transfer molding, extrusion molding or injection molding.

EXAMPLES 1-3

A powder mixture, which had been obtained in advance by mixing 1057 g (2 moles) of 4,4'-bis(3-maleimidophenoxy)-biphenyl and 368 g (1 mole) of 4,4'-bis(3-aminophenoxy)biphenyl, was charged in a stainless steel vessel equipped with a stirrer, a reflux condenser and a nitrogen gas inlet tube. They were heated, molten and reacted at 180° C. for 20 minutes. The reaction product was then cooled to room temperature. The reaction product, which had been solidified into a transparent glass-like mass of a brown color, was broken into pieces and taken out of the vessel. It was ground further in a mortar and then sifted through a 60-mesh sieve, thereby obtaining a fine yellow powder of a partly-hardened polyaminobismaleimide resin. Yield: 1390 g (97.5%). Its softening temperature was 118° C., while its gelling time was 59-75 seconds at 200° C.

With 100 parts-by-weight portions of the thus-obtained polyaminobismaleimide resins, quartz powder having a particle size distribution of 1-50 µm was mixed in the amounts shown in Table 1 at room temperature. After the resultant mixtures were separately kneaded at 150° C. and then cooled, they were ground to obtain molding materials. Each of the thus-obtained molding materials was formed into tablets. After the resultant tablets were preheated, they were separately filled in cavities (10×80×4 mm) of a mold which was heated at 220° C. to perform transfer molding, thereby obtaining specimens for the measurement of mechanical properties. Their Izod impact tests (unnotched), bend tests (measurement temperatures: 25° C. and 180° C.) and measurement of heat distortion temperature (18.5 kg/cm$^2$) were carried out in accordance with JIS K-6911. The results shown in Table 1 were obtained.

EXAMPLE 4

With 100 parts-by-weight portions of a polyaminobismaleimide resin obtained in the same manner as in Examples 1-3, amorphous quartz glass powder having a particle size distribution of 1-50 µm was mixed at room temperature. After the resultant mixture was kneaded at 150° C. and then cooled, it was ground to obtain a molding material. The procedure of Examples 1-3 was thereafter followed to obtain the results shown in Table 1.

EXAMPLE 5

To 100 parts-by-weight portions of a polyaminobismaleimide resin obtained from 529 g (1 mole) of 4,4'-bis(3-maleimidophenoxy)biphenyl and 111 g (0.3 mole) of 4,4'-bis(3-aminophenoxy)biphenyl in the same manner as in Examples 1-3, the same quartz powder as those employed in Examples 1-3 was added in the amount shown in Table 1. The procedure of Examples 1-3 was thereafter followed to obtain the results shown in Table 1.

EXAMPLE 6

To 100 parts-by-weight portions of a polyaminobismaleimide resin obtained from 529 g (1 mole) of 4,4'-bis(3-maleimidophenoxy)biphenyl and 258 g (0.7 mole) of 4,4'-bis(3-aminophenoxy)biphenyl in the same manner as in Examples 1-3, the same quartz powder as those employed in Examples 1-3 was added in the amount shown in Table 1. The procedure of Examples 1-3 was thereafter followed to obtain the results shown in Table 1.

EXAMPLES 7-21 AND COMPARATIVE EXAMPLES 1-3

To 100 parts-by-weight portions of polyaminobismaleimide resins obtained by using at a molar ratio of 2:1 bismaleimide compounds and diamine compounds shown in Table 1, the same quartz powder as those employed in Examples 1-3 was added in the amounts shown in Table 1. The procedure of Examples 1-3 was thereafter followed to obtain the results shown in Table 1.

COMPARATIVE EXAMPLE 4

With 67 parts by weight of a novolak cresolepoxy resin (epoxy equivalent: 215), 33 parts by weight of a novolak phenol resin (phenol equivalent: 107) and 250 parts by weight of the same quartz powder as those employed in Examples 1-3 were mixed at room temperature. After the resultant mixture was kneaded at 90°-95° C. and then cooled, it was ground to obtain a molding material. The procedure of Examples 1-3 was thereafter followed to obtain the results shown in Table 1.

COMPARATIVE EXAMPLE 5

With 67 parts by weight of a novolak cresolepoxy resin (epoxy equivalent: 215), 33 parts by weight of a novolak phenol resin (phenol equivalent: 107) and 250 parts by weight of the same amorphous quartz glass powder as that employed in Example 4 were mixed at room temperature. After the resultant mixture was kneaded at 90°-95° C. and then cooled, it was ground to obtain a molding material. The procedure of Examples 1-3 was thereafter followed to obtain the results shown in Table 1.

EXAMPLES 22-24

With 100 parts-by-weight portions of polyaminobismaleimide resin powder obtained in the same manner as in Examples 1-3, alumina powder having a particle size distribution of 1-50 µm was mixed in the amounts shown in Table 2 at room temperature. After the resultant mixtures were separately kneaded at 150° C. and then cooled, they were ground to obtain molding materials. The procedure of Examples 1-3 was thereafter followed to obtain the results shown in Table 2.

EXAMPLE 25

To 100 parts-by-weight portions of a polyaminobismaleimide resin obtained from 529 g (1 mole) of 4,4'-bis(3-maleimidophenoxy)biphenyl and 111 g (0.3 mole) of 4,4'-bis(3-aminophenoxy)biphenyl in the same manner as in Examples 22-24, the same alumina powder as those employed in Examples 22-24 was added in the amount shown in Table 2. The procedure of Examples 22-24 was thereafter followed to obtain the results shown in Table 2.

EXAMPLE 26

To 100 parts-by-weight portions of a polyaminobismaleimide resin obtained from 529 g (1 mole) of 4,4'-bis(3-maleimidophenoxy)biphenyl and 258 g (0.7 mole) of 4,4'-bis(3-aminophenoxy)biphenyl in the same manner as in Examples 22-24, the same alumina powder as those employed in Examples 22-24 was added in the amount shown in Table 2. The procedure of Examples 22-24 was thereafter followed to obtain the results shown in Table 2.

EXAMPLES 27-41 AND COMPARATIVE EXAMPLES 6-8

To 100 parts-by-weight portions of polyaminobismaleimide resins obtained by using at a molar ratio of 2:1 bismaleimide compounds and diamine compounds shown in Table 2, the same alumina powder as those employed in Examples 22-24 was added in the amounts shown in Table 2. The procedure of Examples 22-24 was thereafter followed to obtain the results shown in Table 2.

COMPARATIVE EXAMPLE 9

With 67 parts by weight of a novolak cresolepoxy resin (epoxy equivalent: 215), 33 parts by weight of a novolak phenol resin (phenol equivalent: 107) and 250 parts by weight of the same alumina powder as those employed in Examples 22-24 were mixed at room temperature. After the resultant mixture was kneaded at 90°-95° C. and then cooled, it was ground to obtain a molding material. The procedure of Examples 22-24 was thereafter followed to obtain the results shown in Table 2.

EXAMPLES 42-44

With 100 parts-by-weight portions of polyaminobismaleimide resin powder obtained in the same manner as in Examples 1-3, silicon carbide powder having a particle size distribution of 1-50 μm was mixed in the amounts shown in Table 3 at room temperature. After the resultant mixtures were separately kneaded at 150° C. and then cooled, they were ground to obtain molding materials. The procedure of Examples 1-3 was thereafter followed to obtain the results shown in Table 3.

EXAMPLE 45

To 100 parts-by-weight portions of a polyaminobismaleimide resin obtained from 529 g (1 mole) of 4,4'-bis(3-maleimidophenoxy)biphenyl and 111 g (0.3 mole) of 4,4'-bis(3-aminophenoxy)biphenyl in the same manner as in Examples 42-44, the same silicon carbide powder as those employed in Examples 42-44 was added in the amount shown in Table 3. The procedure of Examples 42-44 was thereafter followed to obtain the results shown in Table 3.

EXAMPLE 46

To 100 parts-by-weight portions of a polyaminobismaleimide resin obtained from 529 g (1 mole) of 4,4'-bis(3-maleimidophenoxy)biphenyl and 258 g (0.7 mole) of 4,4'-bis(3-aminophenoxy)biphenyl in the same manner as in Examples 42-44, the same silicon carbide powder as those employed in Examples 42-44 was added in the amount shown in Table 3. The procedure of Examples 42-44 was thereafter followed to obtain the results shown in Table 3.

EXAMPLES 47-61 AND COMPARATIVE EXAMPLES 10-12

To 100 parts-by-weight portions of polyaminobismaleimide resins obtained by using at a molar ratio of 2:1 bismaleimide compounds and diamine compounds shown in Table 3, the same silicon carbide powder as those employed in Examples 42-44 was added in the amounts shown in Table 3. The procedure of Examples 42-44 was thereafter followed to obtain the results shown in Table 3.

COMPARATIVE EXAMPLE 13

With 67 parts by weight of a novolak cresolepoxy resin (epoxy equivalent: 215), 33 parts by weight of a novolak phenol resin (phenol equivalent: 107) and 250 parts by weight of the same silicon carbide powder as those employed in Examples 42-44 were mixed at room temperature. After the resultant mixture was kneaded at 90°-95° C. and then cooled, it was ground to obtain a molding material. The procedure of Examples 42-44 was thereafter followed to obtain the results shown in Table 3.

TABLE 1

| | Resin composition (parts by weight) | | | Flexural strength (Kg/mm$^2$) | | Coefficient of flexural elasticity (Kg/mm$^2$) | | Izod impact strength (unnotched) (Kg · cm/cm) | Heat distortion temp. temperature (18.5 kg/cm$^2$) |
|---|---|---|---|---|---|---|---|---|---|
| | Resin (100 parts by weight) | | Silica | | | | | | |
| | Bismaleimide | Diamine | powder | 25° C. | 180° C. | 25° C. | 180° C. | 25° C. | (°C.) |
| Ex. 1 | 4,4'-Bis(3-maleimido-phenoxy)biphenyl | 4,4'-Bis(3-amino-phenoxy)biphenyl | 50* | 18.0 | 12.1 | 995 | 750 | 26 | 247 |
| Ex. 2 | 4,4'-Bis(3-maleimido-phenoxy)biphenyl | 4,4'-Bis(3-amino-phenoxy)biphenyl | 250* | 22.0 | 15.1 | 1590 | 1190 | 32 | 269 |
| Ex. 3 | 4,4'-Bis(3-maleimido-phenoxy)biphenyl | 4,4'-Bis(3-amino-phenoxy)biphenyl | 400* | 23.2 | 16.2 | 1720 | 1290 | 36 | 285 |
| Ex. 4 | 4,4'-Bis(3-maleimido-phenoxy)biphenyl | 4,4'-Bis(3-amino-phenoxy)biphenyl | 250** | 22.0 | 16.5 | 1570 | 1180 | 32 | 265 |
| Ex. 5 | 4,4'-Bis(3-maleimido-phenoxy)biphenyl | 4,4'-Bis(3-amino-phenoxy)biphenyl | 250* | 21.5 | 14.3 | 1540 | 1070 | 30 | 268 |
| Ex. 6 | 4,4'-Bis(3-maleimido-phenoxy)biphenyl | 4,4'-Bis(3-amino-phenoxy)biphenyl | 250* | 22.0 | 15.2 | 1600 | 1100 | 31 | 265 |
| Ex. 7 | 4,4'-Bis(3-maleimido- | 1,3-Bis(3-amino- | 250* | 21.5 | 14.8 | 1550 | 1160 | 32 | 267 |

TABLE 1-continued

| | Resin composition (parts by weight) | | | Flexural strength (Kg/mm$^2$) | | Coefficient of flexural elasticity (Kg/mm$^2$) | | Izod impact strength (unnotched) (Kg·cm/cm) | Heat distortion temp. temperature (18.5 kg/cm$^2$) |
|---|---|---|---|---|---|---|---|---|---|
| | Resin (100 parts by weight) | | Silica | | | | | | |
| | Bismaleimide | Diamine | powder | 25° C. | 180° C. | 25° C. | 180° C. | 25° C. | (°C.) |
| Ex. 8 | 4,4'-Bis(3-maleimido-phenoxy)biphenyl | 2,2-Bis[4-(3-amino-phenoxy)phenyl]propane | 250* | 21.5 | 15.3 | 1600 | 1230 | 32 | 270 |
| Ex. 9 | 4,4'-Bis(3-maleimido-phenoxy)biphenyl | Bis[4-(3-aminophenoxy)-phenyl]sulfide | 250* | 20.9 | 14.5 | 1610 | 1210 | 32 | 270 |
| Ex. 10 | 1,3-Bis(3-maleimido-phenoxy)benzene | 4,4'-Bis(3-amino-phenoxy)biphenyl | 250* | 20.0 | 13.7 | 1610 | 1170 | 32 | 270 |
| Ex. 11 | 1,3-Bis(3-maleimido-phenoxy)benzene | 1,3-Bis(3-amino-phenoxy)benzene | 250* | 20.0 | 14.0 | 1610 | 1200 | 33 | 272 |
| Ex. 12 | 1,3-Bis(3-maleimido-phenoxy)benzene | 2,2-Bis[4-(3-amino-phenoxy)phenyl]propane | 250* | 21.5 | 14.6 | 1650 | 1240 | 31 | 269 |
| Ex. 13 | 1,3-Bis(3-maleimido-phenoxy)benzene | BIs[4-(3-aminophenoxy)-phenyl]sulfide | 250* | 22.0 | 14.3 | 1590 | 1170 | 31 | 270 |
| Ex. 14 | 2,2-Bis[4-(3-male-imidophenoxy)phenyl]-propane | 4,4'-Bis(3-amino-phenoxy)biphenyl | 250* | 21.7 | 14.5 | 1570 | 1180 | 33 | 271 |
| Ex. 15 | 2,2-Bis[4-(3-male-imidophenoxy)phenyl]-propane | 1,3-Bis(3-amino-phenoxy)benzene | 250* | 22.5 | 15.2 | 1540 | 1160 | 32 | 267 |
| Ex. 16 | 2,2-Bis[4-(3-male-imidophenoxy)phenyl]-propane | 2,2-Bis[4-(3-amino-phenoxy)phenyl]propane | 250* | 20.5 | 13.9 | 1600 | 1220 | 32 | 270 |
| Ex. 17 | 2,2-Bis[4-(3-male-imidophenoxy)phenyl]-propane | Bis[4-(3-aminophenoxy)-phenyl]sulfide | 250* | 21.6 | 15.1 | 1580 | 1170 | 31 | 270 |
| Ex. 18 | Bis[4-(3-maleimido-phenoxy)phenyl]-sulfide | 4,4'-Bis(3-amino-phenoxy)biphenyl | 250* | 21.5 | 15.3 | 1620 | 1200 | 30 | 273 |
| Ex. 19 | Bis[4-(3-maleimido-phenoxy)phenyl]-sulfide | 1,3-Bis(3-amino-phenoxy)benzene | 250* | 22.0 | 14.3 | 1520 | 1140 | 33 | 268 |
| Ex. 20 | Bis[4-(3-maleimido-phenoxy)phenyl]-sulfide | 2,2-Bis[4-(3-amino-phenoxy)phenyl]propane | 250* | 21.5 | 14.2 | 1630 | 1210 | 32 | 269 |
| Ex. 21 | Bis[4-(3-maleimido-phenoxy)phenyl]-sulfide | Bis[4-(3-aminophenoxy)-phenyl]sulfide | 250* | 20.5 | 14.5 | 1620 | 1210 | 32 | 270 |
| Comp. Ex. 1 | 4,4'-Bis(3-maleimido-phenoxy)biphenyl | 4,4'-Bis(3-amino-phenoxy)biphenyl | 0 | 15.6 | 9.9 | 338 | 253 | 20 | 242 |
| Comp. Ex. 2 | 4,4'-Bis(3-maleimido-phenoxy)biphenyl | 4,4'-Bis(3-amino-phenoxy)biphenyl | 20* | 16.0 | 10.0 | 465 | 295 | 21 | 243 |
| Comp. Ex. 3 | 4,4'-Bis(3-maleimido-phenoxy)biphenyl | 4,4'-Bis(3-amino-phenoxy)biphenyl | 850* | Molding was infeasible due to lack of melt fluidity | | | | | |
| Comp. Ex. 4 | Novolak cresol-epoxy resin (epoxy equivalent: 215) 67 parts by weight | Novolak phenol resin (phenol equivalent: 107) 33 parts by weight | 250* | 13.2 | 2.0 | 1570 | 100 | 32 | 148 |
| Comp. Ex. 5 | Novolak cresol-epoxy resin (epoxy equivalent: 215) 67 parts by weight | Novalak phenol resin (phenol equivalent: 107) 33 parts by weight | 250** | 14.5 | 1.7 | 1500 | 90 | 30 | 150 |

*Quartz powder;
**Amorphous quartz glass powder.

TABLE 2

| | Resin composition (parts by weight) | | | Flexural strength (Kg/mm$^2$) | | Coefficient of flexural elasticity (Kg/mm$^2$) | | Izod impact strength (unnotched) (Kg·cm/cm) | Heat distortion temp. temperature (18.5 kg/cm$^2$) |
|---|---|---|---|---|---|---|---|---|---|
| | Resin (100 parts by weight) | | Alumina | | | | | | |
| | Bismaleimide | Diamine | powder | 25° C. | 180° C. | 25° C. | 180° C. | 25° C. | (°C.) |
| Ex. 22 | 4,4'-Bis(3-maleimido-phenoxy)biphenyl | 4,4'-Bis(3-amino-phenoxy)biphenyl | 50 | 18.0 | 12.0 | 990 | 745 | 27 | 246 |
| Ex. 23 | 4,4'-Bis(3-maleimido-phenoxy)biphenyl | 4,4'-Bis(3-amino-phenoxy)biphenyl | 250 | 22.0 | 14.8 | 1510 | 1170 | 32 | 269 |
| Ex. 24 | 4,4'-Bis(3-maleimido-phenoxy)biphenyl | 4,4'-Bis(3-amino-phenoxy)biphenyl | 400 | 24.5 | 16.4 | 1700 | 1260 | 35 | 285 |
| Ex. 25 | 4,4'-Bis(3-maleimido-phenoxy)biphenyl | 4,4'-Bis(3-amino-phenoxy)biphenyl | 250 | 21.8 | 14.6 | 1520 | 1155 | 31 | 268 |
| Ex. 26 | 4,4'-Bis(3-maleimido-phenoxy)biphenyl | 4,4'-Bis(3-amino-phenoxy)biphenyl | 250 | 22.0 | 14.7 | 1500 | 1160 | 31 | 267 |
| Ex. 27 | 4,4'-Bis(3-maleimido-phenoxy)biphenyl | 1,3-Bis(3-amino-phenoxy)benzene | 250 | 22.0 | 14.6 | 1500 | 1170 | 32 | 268 |
| Ex. 28 | 4,4'-Bis(3-maleimido-phenoxy)biphenyl | 2,2-Bis[4-(3-amino-phenoxy)phenyl]propane | 250 | 22.2 | 14.6 | 1500 | 1170 | 32 | 268 |
| Ex. 29 | 4,4'-Bis(3-maleimido-phenoxy)biphenyl | Bis[4-(3-aminophenoxy)- | 250 | 22.2 | 14.8 | 1510 | 1180 | 33 | 268 |

TABLE 2-continued

| | Resin composition (parts by weight) | | Alumina powder | Flexural strength (Kg/mm$^2$) | | Coefficient of flexural elasticity (Kg/mm$^2$) | | Izod impact strength (unnotched) (Kg · cm/cm) | Heat distortion temp. temperature (18.5 kg/cm$^2$) |
|---|---|---|---|---|---|---|---|---|---|
| | Resin (100 parts by weight) | | | | | | | | |
| | Bismaleimide | Diamine | | 25° C. | 180° C. | 25° C. | 180° C. | 25° C. | (°C.) |
| Ex. 30 | 1,3-Bis(3-maleimido-phenoxy)benzene | 4,4'-Bis(3-amino-phenoxy)biphenyl | 250 | 21.9 | 14.6 | 1500 | 1160 | 32 | 268 |
| Ex. 31 | 1,3-Bis(3-maleimido-phenoxy)benzene | 1,3-Bis(3-amino-phenoxy)benzene | 250 | 22.0 | 14.8 | 1490 | 1160 | 33 | 268 |
| Ex. 32 | 1,3-Bis(3-maleimido-phenoxy)benzene | 2,2-Bis[4-(3-amino-phenoxy)phenyl]propane | 250 | 22.0 | 14.8 | 1520 | 1160 | 33 | 268 |
| Ex. 33 | 1,3-Bis(3-maleimido-phenoxy)benzene | Bis[4-(3-aminophenoxy)-phenyl]sulfide | 250 | 21.8 | 15.0 | 1550 | 1170 | 31 | 267 |
| Ex. 34 | 2,2-Bis[4-(3-male-imidophenoxy)phenyl]-propane | 4,4'-Bis(3-amino-phenoxy)biphenyl | 250 | 21.9 | 15.2 | 1540 | 1180 | 32 | 267 |
| Ex. 35 | 2,2-Bis[4-(3-male-imidophenoxy)phenyl]-propane | 1,3-Bis(3-amino-phenoxy)benzene | 250 | 22.0 | 15.0 | 1520 | 1190 | 32 | 267 |
| Ex. 36 | 2,2-Bis[4-(3-male-imidophenoxy)phenyl]-propane | 2,2-Bis[4-(3-amino-phenoxy)phenyl]propane | 250 | 22.0 | 15.0 | 1520 | 1160 | 32 | 269 |
| Ex. 37 | 2,2-Bis[4-(3-male-imidophenoxy)phenyl]-propane | Bis[4-(3-aminophenoxy)-phenyl]sulfide | 250 | 21.5 | 14.9 | 1520 | 1170 | 31 | 268 |
| Ex. 38 | Bis[4-(3-maleimido-phenoxy)phenyl]-sulfide | 4,4'-Bis(3-amino-phenoxy)biphenyl | 250 | 22.0 | 14.9 | 1510 | 1160 | 32 | 268 |
| Ex. 39 | Bis[4-(3-maleimido-phenoxy)phenyl]-sulfide | 1,3-Bis(3-amino-phenoxy)benzene | 250 | 21.5 | 14.5 | 1490 | 1170 | 32 | 269 |
| Ex. 40 | Bis[4-(3-maleimido-phenoxy)phenyl]-sulfide | 2,2-Bis[4-(3-amino-phenoxy)phenyl]propane | 250 | 22.0 | 15.0 | 1500 | 1200 | 32 | 268 |
| Ex. 41 | Bis[4-(3-maleimido-phenoxy)phenyl]-sulfide | Bis[4-(3-aminophenoxy)-phenyl]sulfide | 250 | 22.0 | 14.8 | 1500 | 1200 | 31 | 268 |
| Comp. Ex. 6 | 4,4'-Bis(3-maleimido-phenoxy)biphenyl | 4,4'-Bis(3-amino-phenoxy)biphenyl | 0 | 15.6 | 9.9 | 338 | 253 | 20 | 242 |
| Comp. Ex. 7 | 4,4'-Bis(3-maleimido-phenoxy)biphenyl | 4,4'-Bis(3-amino-phenoxy)biphenyl | 20 | 15.9 | 10.0 | 460 | 290 | 20 | 243 |
| Comp. Ex. 8 | 4,4'-Bis(3-maleimido-phenoxy)biphenyl | 4,4'-Bis(3-amino-phenoxy)biphenyl | 850 | Molding was infeasible due to lack of melt fluidity | | | | | |
| Comp. Ex. 9 | Novolak cresol-epoxy resin (epoxy equivalent: 215) 67 parts by weight | Novolak phenol resin (phenol equivalent: 107 (33 parts by weight | 250 | 13.2 | 2.0 | 1570 | 100 | 32 | 148 |

TABLE 3

| | Resin composition (parts by weight) | | Silicon Carbide powder | Flexural strength (Kg/mm$^2$) | | Coefficient of flexural elasticity (Kg/mm$^2$) | | Izod impact strength (unnotched) (Kg · cm/cm) | Heat distortion temp. temperature (18.5 kg/cm$^2$) |
|---|---|---|---|---|---|---|---|---|---|
| | Resin (100 parts by weight) | | | | | | | | |
| | Bismaleimide | Diamine | | 25° C. | 180° C. | 25° C. | 180° C. | 25° C. | (°C.) |
| Ex. 42 | 4,4'-Bis(3-maleimido-phenoxy)biphenyl | 4,4'-Bis(3-amino-phenoxy)biphenyl | 50 | 18.0 | 12.0 | 990 | 735 | 25 | 248 |
| Ex. 43 | 4,4'-Bis(3-maleimido-phenoxy)biphenyl | 4,4'-Bis(3-amino-phenoxy)biphenyl | 250 | 21.5 | 14.9 | 1480 | 1120 | 30 | 268 |
| Ex. 44 | 4,4'-Bis(3-maleimido-phenoxy)biphenyl | 4,4'-Bis(3-amino-phenoxy)biphenyl | 400 | 23.0 | 16.0 | 1690 | 1210 | 34 | 282 |
| Ex. 45 | 4,4'-Bis(3-maleimido-phenoxy)biphenyl | 4,4'-Bis(3-amino-phenoxy)biphenyl | 250 | 22.0 | 15.0 | 1470 | 1100 | 30 | 267 |
| Ex. 46 | 4,4'-Bis(3-maleimido-phenoxy)biphenyl | 4,4'-Bis(3-amino-phenoxy)biphenyl | 250 | 21.5 | 14.8 | 1470 | 1150 | 30 | 268 |
| Ex. 47 | 4,4'-Bis(3-maleimido-phenoxy)biphenyl | 1,3-Bis(3-amino-phenoxy)benzene | 250 | 22.0 | 14.8 | 1450 | 1120 | 30 | 267 |
| Ex. 48 | 4,4'-Bis(3-maleimido-phenoxy)biphenyl | 2,2-Bis[4-(3-amino-phenoxy)phenyl]propane | 250 | 21.0 | 14.9 | 1460 | 1120 | 31 | 267 |
| Ex. 49 | 4,4'-Bis(3-maleimido-phenoxy)biphenyl | Bis[4-(3-aminophenoxy)-phenyl]sulfide | 250 | 21.0 | 15.0 | 1450 | 1130 | 29 | 266 |
| Ex. 50 | 1,3-Bis(3-maleimido-phenoxy)benzene | 4,4'-Bis(3-amino-phenoxy)biphenyl | 250 | 21.5 | 14.8 | 1470 | 1120 | 30 | 267 |
| Ex. 51 | 1,3-Bis(3-maleimido-phenoxy)benzene | 1,3-Bis(3-amino-phenoxy)benzene | 250 | 21.0 | 14.8 | 1460 | 1120 | 30 | 267 |
| Ex. 52 | 1,3-Bis(3-maleimido-phenoxy)benzene | 2,2-Bis[4-(3-amino-phenoxy)phenyl]propane | 250 | 22.0 | 15.0 | 1460 | 1170 | 30 | 268 |
| Ex. 53 | 1,3-Bis(3-maleimido- | Bis[4-(3-aminophenoxy)- | 250 | 22.0 | 14.9 | 1470 | 1180 | 29 | 267 |

TABLE 3-continued

| | Resin composition (parts by weight) Resin (100 parts by weight) | | Silicon Carbide powder | Flexural strength (Kg/mm²) | | Coefficient of flexural elasticity (Kg/mm²) | | Izod impact strength (unnotched) (Kg · cm/cm) | Heat distortion temp. temperature (18.5 kg/cm²) |
|---|---|---|---|---|---|---|---|---|---|
| | Bismaleimide | Diamine | | 25° C. | 180° C. | 25° C. | 180° C. | 25° C. | (°C.) |
| Ex. 54 | phenoxy)benzene 2,2-Bis[4-(3-male-imidophenoxy)phenyl]-propane | phenyl]sulfide 4,4'-Bis(3-amino-phenoxy)biphenyl | 250 | 21.0 | 15.0 | 1460 | 1100 | 31 | 265 |
| Ex. 55 | 2,2-Bis[4-(3-male-imidophenoxy)phenyl]-propane | 1,3-Bis(3-amino-phenoxy)benzene | 250 | 22.0 | 14.9 | 1480 | 1080 | 30 | 267 |
| Ex. 56 | 2,2-Bis[4-(3-male-imidophenoxy)phenyl]-propane | 2,2-Bis[4-(3-amino-phenoxy)phenyl]propane | 250 | 21.5 | 14.7 | 1480 | 1100 | 30 | 267 |
| Ex. 57 | 2,2-Bis[4-(3-male-imidophenoxy)phenyl]-propane | Bis[4-(3-aminophenoxy)-phenyl]sulfide | 250 | 21.5 | 14.9 | 1480 | 1100 | 31 | 267 |
| Ex. 58 | Bis[4-(3-maleimido-phenoxy)phenyl]-sulfide | 4,4'-Bis(3-amino-phenoxy)biphenyl | 250 | 21.0 | 15.2 | 1480 | 1120 | 29 | 265 |
| Ex. 59 | Bis[4-(3-maleimido-phenoxy)phenyl]-sulfide | 1,3-Bis(3-amino-phenoxy)benzene | 250 | 21.0 | 15.0 | 1480 | 1110 | 31 | 266 |
| Ex. 60 | Bis[4-(3-maleimido-phenoxy)phenyl]-sulfide | 2,2-Bis[4-(3-amino-phenoxy)phenyl]propane | 250 | 21.5 | 14.8 | 1470 | 1120 | 31 | 267 |
| Ex. 61 | Bis[4-(3-maleimido-phenoxy)phenyl]-sulfide | Bis[4-(3-aminophenoxy)-phenyl]sulfide | 250 | 21.0 | 14.8 | 1470 | 1120 | 31 | 266 |
| Comp. Ex. 10 | 4,4'-Bis(3-amleimido-phenoxy)biphenyl | 4,4'-Bis(3-amino-phenoxy)biphenyl | 0 | 15.6 | 9.9 | 338 | 253 | 20 | 242 |
| Comp. Ex. 11 | 4,4'-Bis(3-amleimido-phenoxy)biphenyl | 4,4'-Bis(3-amino-phenoxy)biphenyl | 20 | 16.0 | 9.9 | 460 | 2850 | 21 | 243 |
| Comp. Ex. 12 | 4,4'-Bis(3-amleimido-phenoxy)biphenyl | 4,4'-Bis(3-amino-phenoxy)biphenyl | 850 | Molding was infeasible due to lack of melt fluidity | | | | | |
| Comp. Ex. 13 | Novolak cresol-epoxy resin (epoxy equivalent: 215) 67 parts by weight | Novolak phenol resin (phenol equivalent: 107) 33 parts by weight | 250 | 13.2 | 2.0 | 1570 | 100 | 32 | 148 |

What is claimed is:

1. A thermosetting resin composition comprising:
   (a) 100 parts by weight of a polyaminobismaleimide resin consisting essentially of a bismaleimide compound represented by the following formula (I):

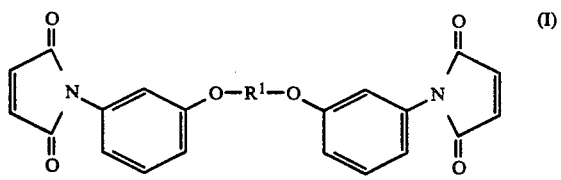

(I)

wherein $R^1$ is a divalent group of

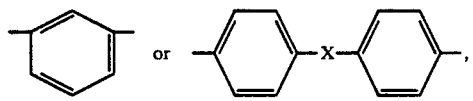

and X is a direct bond or a group selected from the group consisting of a divalent hydrocarbon group having 1 to 10 carbon atoms, a hexafluorinated isopropylidene group, a carbonyl group, a thio group, a sulfinyl group, a sulfonyl group and an oxo group, and a diamine compound represented by the following formula (II):

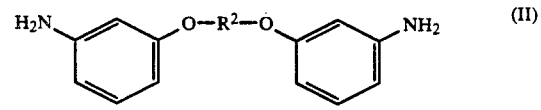

(II)

wherein $R^2$ is a divalent group of

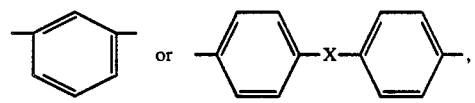

and X is a direct bond or a group selected from the group consisting of a divalent hydrocarbon group having 1 to 10 carbon atoms, a hexflouorinated isopropylidene group, a carbonyl group, a thio group, a sulfinyl group, a sulfonyl group and an oxo group; and
   (b) 30 to 800 parts by weight of silica powder.

2. The thermosetting resin composition of claim 1 wherein the amount of the silica powder is from 50 to 800 parts by weight per 100 parts by weight of the polyaminobismaleimide resin.

3. The thermosetting resin composition of claim 1 wherein the amount of the silica powder is from 250 to 800 parts by weight per 100 by weight of the polyaminobismaleimide resin.

* * * * *